(12) United States Patent
Ritter et al.

(10) Patent No.: US 7,478,065 B1
(45) Date of Patent: Jan. 13, 2009

(54) PAYMENT TRANSACTION METHOD AND PAYMENT TRANSACTION SYSTEM

(75) Inventors: Rudolf Ritter, Zollikofen (CH); Georges Schlegel, Oberdorf (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/168,387

(22) PCT Filed: Dec. 23, 1999

(86) PCT No.: PCT/CH99/00632

§ 371 (c)(1),
(2), (4) Date: Jul. 11, 2002

(87) PCT Pub. No.: WO01/69555

PCT Pub. Date: Sep. 20, 2001

(51) Int. Cl.
*G06Q 1/12* (2006.01)
*G06Q 20/00* (2006.01)
*G06Q 40/00* (2006.01)

(52) U.S. Cl. .......................... 705/39; 705/21; 705/16; 705/17; 705/41

(58) Field of Classification Search .................. 705/21, 705/16, 17, 39, 41
See application file for complete search history.

(56) References Cited

U.S. PATENT DOCUMENTS

| | | | |
|---|---|---|---|
| 5,986,565 A | | 11/1999 | Isaka |
| 6,032,859 A | * | 3/2000 | Muehlberger et al. ....... 235/449 |
| 6,078,806 A | * | 6/2000 | Heinonen et al. ........... 455/406 |
| 6,219,793 B1 | * | 4/2001 | Li et al. ..................... 726/19 |
| 7,167,711 B1 | * | 1/2007 | Dennis ................... 455/456.1 |

FOREIGN PATENT DOCUMENTS

| | | |
|---|---|---|
| WO | 96 25828 | 8/1996 |
| WO | 98 11519 | 3/1998 |
| WO | 98 34203 | 8/1998 |
| WO | 98 37524 | 8/1998 |

OTHER PUBLICATIONS

U.S. Appl. No. 10/149,430, filed Jun. 24, 2002, Pending.

* cited by examiner

*Primary Examiner*—James P. Trammell
*Assistant Examiner*—Scott Trotter
(74) *Attorney, Agent, or Firm*—Oblon, Spivak, McClelland, Maier & Neustadt, P.C.

(57) ABSTRACT

Payment transaction method and payment transaction system in which payment transactions between customers with portable mobile devices (1), for example mobile radio telephones, and a plurality of payment terminals (2) are carried out at a service point (5), the payment terminal (2) responsible for a payment transaction informing the respective customer about its payment terminal identification and a total transaction amount, the customer indicating the payment terminal identification to the mobile device (1) and the mobile device (1) transmitting a transaction initiation record, comprising the payment terminal identification as well as a customer identification, via a contactless device interface (11-21) to the payment terminal (2) as well as via a mobile radio network (6) to a central transaction unit (4), the payment terminal (2) transmitting, after receipt of the transaction initiation record, a transaction placing record comprising a service point identification, the payment terminal identification and the total transaction amount, via a communication network (3) to the central transaction unit (4), and the central transaction unit (4) transmitting a payment request, comprising at least the total transaction amount, to the mobile device (1) from which the transaction initiation record was transmitted.

15 Claims, 2 Drawing Sheets

PAYMENT TRANSACTION METHOD AND PAYMENT TRANSACTION SYSTEM

The present invention relates to a payment transaction method and a payment transaction system. In particular, the present invention relates to a payment transaction method according to the preamble of the independent method claim 1 and to a payment transaction system for carrying out the payment transaction method.

Owing to the growing popularity and spread of mobile telephony, more and more customers of service points, so-called points of sale (POS), for example points of sale of products and/or services, are equipped with portable mobile devices, namely mobile radio telephones, which support the identification and authentication of a respective customer. Since non-cash modes of payment are being used more and more frequently for the payment of products and/or services at the service point and the customers are being provided with numerous different identification cards for this purpose by the various service points, there has been a desire to use the above-mentioned portable mobile devices for this purpose. Conventional mobile radio telephones comprise an identification module, a so-called SIM chipcard (Subscriber Identification Module) containing an unambiguous user identification, for instance an IMSI (International Mobile Subscriber Identity), by means of which the respective user can be identified in a telecommunication network. To prevent use of such a mobile device by an unauthorized user, a user first has to authenticate himself at the mobile device, for example by entering a personal code (Personal Identification Number, PIN) by means of the operating elements of the mobile device, which personal code is compared with a value stored on the SIM chipcard with the aid of security services.

Described in the patent application EP 708 547 A2 is the use of a mobile radio telephone as authenticated transaction controller. At a retail shop, according to the teaching disclosed in EP 708 547 A2, a customer first authenticates himself at his mobile radio telephone, for instance through entry of a personal identification code, then the shop manager and the customer agree upon a transaction password, which is entered by the customer into his mobile radio telephone and is transmitted in a wireless way, together with identification data, for example the device number and the telephone number of the mobile radio telephone, to a receiver of a payment terminal of the retail shop. According to the teaching disclosed in EP 708 547 A2, the respective monetary amount to be paid (which amount is either obtained by the payment terminal or entered by the customer in his mobile radio telephone and transmitted to the receiver of the payment terminal together with the transaction password and the identification data) and the identification data are transmitted to a credit center for credit checking. The transaction password described in EP 708 547 A2 makes it possible in particular for the payment terminal to be able to assign the data transmitted from the mobile radio telephone to the respective transaction and, in so doing, not be interfered with by possible transmissions of other mobile radio telephones.

It is an object of this invention to propose a new payment transaction method and a new payment transaction system which can be used in particular for service points with one or more payment terminals and with one or more customers equipped with mobile devices.

This object is achieved according to the present invention in particular through the features of the independent claims. Further advantageous embodiments follow moreover from the dependent claims and from the description.

This object is achieved through the present invention in particular in that in the payment transactions between a customer with a portable mobile device, for example a mobile radio telephone or a communication-capable palmtop or laptop computer, and a service point with a plurality of payment terminals, in which payment transactions a payment terminal of the service point informs the customer about a total transaction amount to be paid and a payment terminal identification assigned to the payment terminal, and the customer indicates the payment terminal identification to the mobile device, the mobile device prepares a transaction initiation record comprising a linking of the indicated payment terminal identification to a customer identification for the customer, and transmits it via a contactless device interface, for example an infrared interface or a radio interface, directly to the payment terminal and via a mobile radio network, for example a GSM or UMTS network or another, e.g satellite-based, mobile radio network, to a central transaction unit, the payment terminal, following receipt of the transaction initiation record, prepares a transaction placing record comprising at least the customer identification, the payment terminal identification and the total transaction amount, and transmits it via a communication network, for example an above-mentioned mobile radio network or a fixed network, to the central transaction unit, and the central transaction unit transmits a payment request comprising at least the total transaction amount and for instance the payment terminal identification, via the mobile radio network to the mobile device from which mobile device the transaction initiation record was transmitted to the central transaction unit.

Thus in the payment transaction method and payment transaction system according to the invention, a payment transaction between a customer with a portable mobile device and a service point, for example a so-called point of sale (POS), with a plurality of payment terminals, is carried out in two phases. In the first phase, in which the payment terminal identification is indicated by the customer to his mobile device, the transaction initiation record is prepared in the mobile device and is transmitted to the payment terminal as well as to the central transaction unit, the payment terminal taking part in the respective payment transaction and the mobile device taking part in the respective payment transaction are assigned to each other in the central transaction unit, whereby, for example, the authenticity of the two payment transaction partners can also be checked. Then, in the second phase, the financial aspect of the payment transaction between the payment transaction partners can be carried out, whereby, in this phase, no direct communication takes place between the payment terminal and the mobile device since the financial aspect of the payment transaction is dealt with via the central transaction unit. The second phase is initiated by the central transaction unit in that the payment request for the payment transaction is transmitted to the mobile device taking part in the respective payment transaction.

After the payment request has been accepted by the respective customer by means of operating elements of the mobile device, for example, a payment record, comprising a linking of the payment request to a customer identification for the customer, is preferably prepared in the mobile device and transmitted from the mobile device via the mobile radio network to the central transaction unit. The payment record is provided with an electronic signature of the customer, for example, or is implemented as a secured certificate. The central transaction unit, for example a communications server, can further process the payment record or forward it e.g. to a financial institution or a clearing point. Preferably, after receipt of the payment record, the central transaction unit transmits a transaction confirmation, comprising at least indications for identification of the respective payment transaction, via the communication network to the payment terminal and, depending upon the embodiment, also to the mobile device via the mobile radio network.

In an embodiment variant, in the mobile device, before transmission of the payment record to the central transaction unit, indications about the mode of payment are inserted into the payment record, for instance debiting to a particular credit card number, debiting to a particular customer account, debiting to a particular bank account, or debiting against a prepaid monetary sum stored in the mobile device, for instance on the SIM card of the mobile device. The insertion of indications about the intended mode of payment has the advantage that the flexibility of the payment transaction method and the payment transaction system according to the invention is thereby increased and, depending upon the type of desired payment mode, at least certain payment transactions can be posted directly (online) and automatically, whereas others can be entered subsequently (offline), for example with the aid of a clearing point suitable therefor.

When preparing the transaction placing record, the payment terminal preferably inserts a service point identification into the transaction placing record, and the total transaction amount is credited to the service point identified through the service point identification. A service point identification as a component of the transaction placing record has moreover the advantage that payment transactions can be concluded by a multiplicity of service points via the central transaction unit, the service points being able to be assigned to different owners, for example, or respectively different service point operators.

In an embodiment variant, the customer authenticates himself at his mobile device for example with a biometric feature, e.g. a fingerprint, a voice pattern or an eye pattern. The use of biometric features for authentication of a user has the advantage that the security entailed therewith is higher than with the use of a personal code, which can be guessed by unauthorized users, for instance, or forgotten by the authorized user.

In an embodiment variant, the payment terminal transmits the payment terminal identification via a contactless device interface to the mobile device directly, and the customer indicates the payment terminal identification to the mobile device by accepting, by means of operating elements of the mobile device, the payment terminal identification received directly from the payment terminal via the contactless device interface. The advantage of this embodiment variant is that the customer does not have to type the payment terminal identification manually into the mobile device, so entry errors by the customer can be prevented.

In an embodiment variant, the solvency of the customer identified through the transmitted customer identification is checked by the central transaction unit. Based on the result of this solvency check, the central transaction unit can transmit a message to the respective payment terminal as well as to the respective mobile device by means of which message payment of the payment transaction by means of the inventive method is refused for the respective customer owing to lack of solvency, if applicable.

In an embodiment variant, the payment record and/or a transaction confirmation from the central transaction unit regarding the successfully made payment transaction is stored in the mobile device, for example on the SIM card of the mobile device. The advantage of storing payment records and/or transaction confirmations in the mobile device is that it is thereby made possible for the customer to keep track of payment transactions carried out and to use as a receipt a payment record, or respectively a transaction confirmation, stored in the mobile device, in particular when the payment request and/or the transaction confirmation contained in the payment record contains a certificate or an electronic signature of the respective service point and/or central transaction unit.

An embodiment of the present invention will described in the following with reference to an example. The example of the embodiment is illustrated by the following attached figures.

Figure 1:
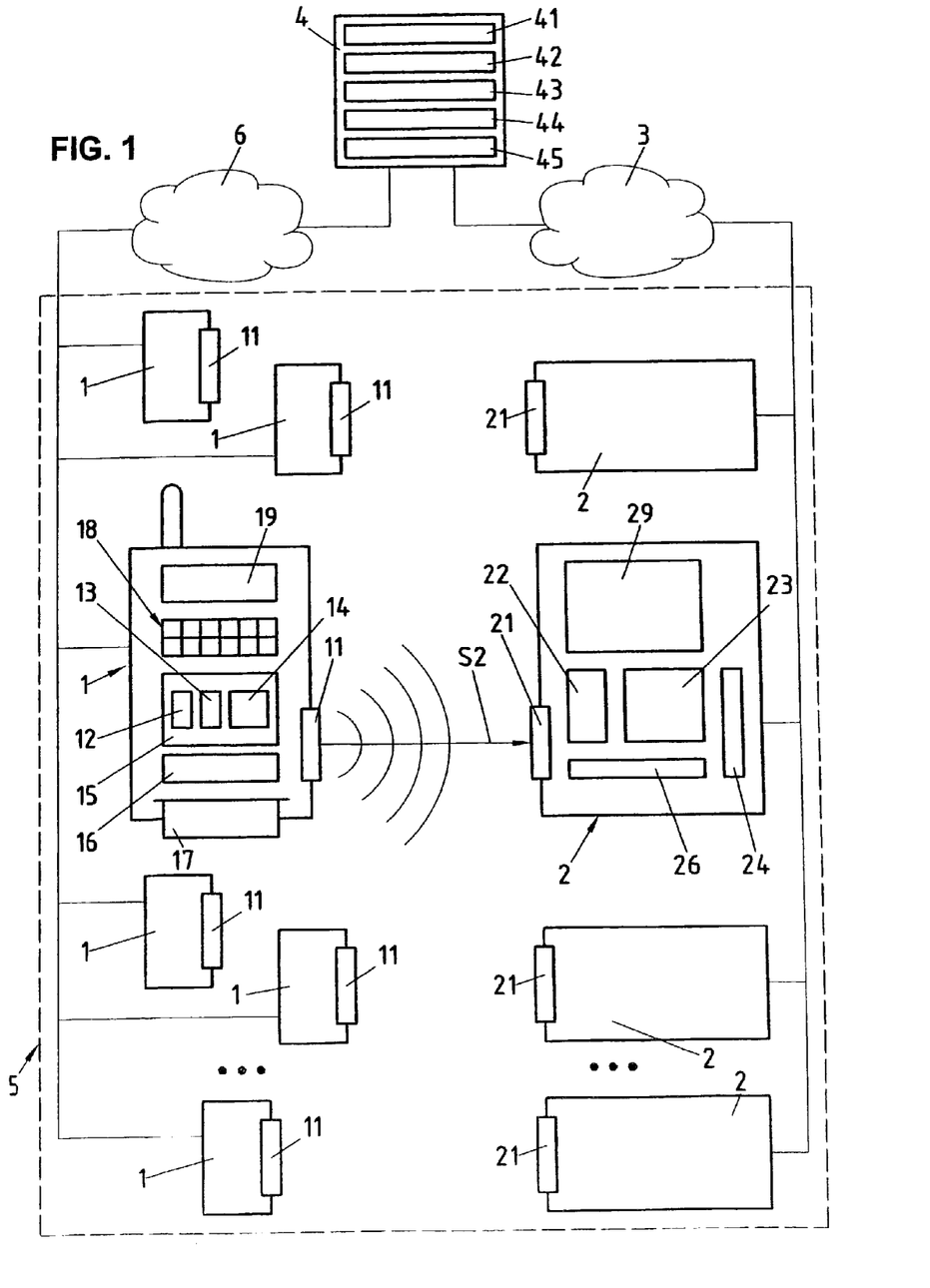
FIG. 1 shows a block diagram illustrating schematically a service point at which a plurality of mobile devices and a plurality of payment terminals are located, the mobile devices being connected via a mobile radio network and the payment terminals via a communication network to a central transaction unit.
Figure 2:
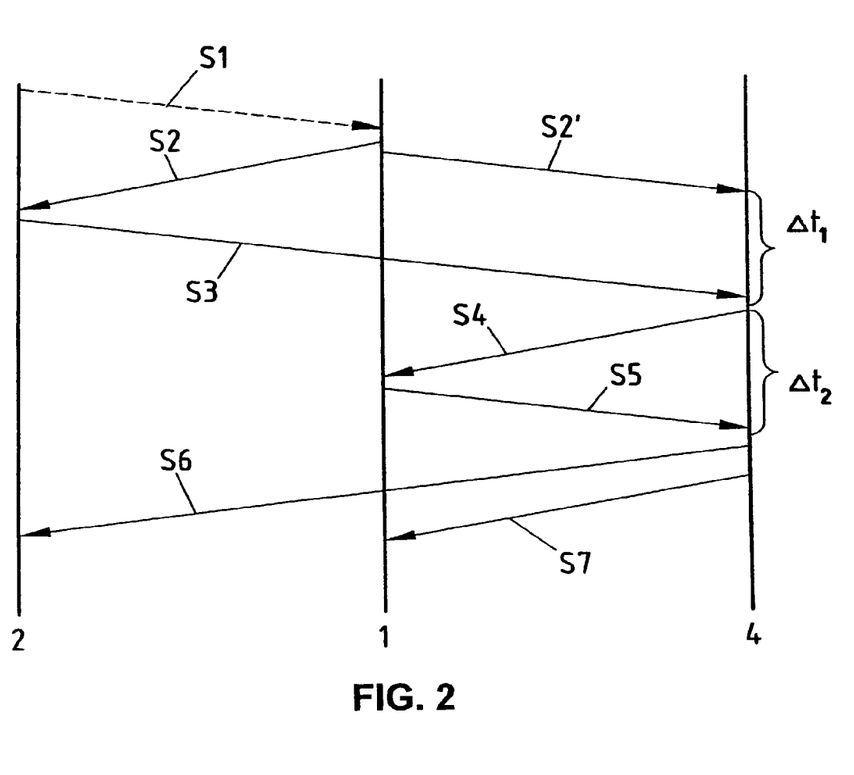
FIG. 2 shows a time diagram illustrating a possible sequential course of the information flow between a payment terminal, a central transaction unit and a mobile device.

In FIGS. 1 and 2, elements designated by a same reference symbol are to be considered as equivalent elements. In FIG. 1, the reference numeral 5 refers to a service point, a so-called point of sale (POS), for example a point of sale of products and services accessible to the public. As illustrated in FIG. 1, located at the service point 5 are a plurality of payment terminals 2 and a plurality of mobile devices 1 carried by customers.

The portable mobile devices 1 are, for example, mobile radio telephones, laptop or palmtop computers or other suitable portable mobile devices which are able to communicate via a mobile radio network 6, for instance a GSM or UMTS network or another, e.g. satellite-based, mobile radio network, i.e. in particular are also able to exchange data. The exchange of data over the mobile radio network 6 can take place, for example, by means of special messages, for instance SMS (Short Message Service) or USSD messages (Unstructured Supplementary Services Data), or by means of special data services, for instance GPRS (Generalized Packet Radio Service) or HSCSD (High Speed Circuit Switched Data).

The term "software module" used in the present description refers in each case to a program code stored in a memory and executed on a processor, for instance in co-operation with suitable operational systems and/or with the aid of services of virtual platforms, e.g. a Java Virtual Machine (Java is a registered trademark of Sun Microsystems), so that the processor is controlled in such a way that it executes the respective functions assigned to the software module. One skilled in the art will understand that the programming language used for implementation of the software module does not change the substance of the present invention, but that the use of certain programming languages, for example Java or another object-oriented and platform-independent programming language, could certainly have advantages known to one skilled in the art. The software modules can be assigned functions, for the execution of which a particular software module uses, as an aid, functions and/or services located in other modules, in one embodiment, e.g. for reasons of efficiency, but which functions are nevertheless also to be understood as functional components of the respective software module.

The payment terminals 2 are based, for example, on conventional electronic cashier systems equipped, for example, with operating elements and price registering components, e.g. laser scanners, that are not shown, and comprise at least one processor 26.

For direct data exchange between a mobile device 1 and a payment terminal 2, which are taking part in a payment transaction as transaction partners, the mobile devices 1 and the payment terminals 2 have a contactless interface 11-21. The mobile devices 1, in a minimal variant, are thereby equipped with at least one transmitter 11 of the contactless interface 11-21. The transmitter 11 comprises the necessary hardware elements for transmission of data, for example in the form of radio or infrared waves, and for the connection of the transmitter to the processor 26 of the mobile device 1, as well as the programmed software modules and software interfaces needed for operation and for control of the transmitter 11 (the transmitter 11 can also be the mobile radio transmitter of the mobile device 1, for instance, which is operated with reduced power). For this minimal variant, the payment terminals are equipped with a corresponding receiver 21 which has the necessary hardware elements and software modules to receive data via the contactless interface 11-21 and to forward it to the processor 26 of the payment terminal 2.

The mobile devices 1 and the payment terminals 2 can also be each equipped with transmitters and receivers for a bi-directional contactless interface 11-21. One skilled in the art will understand that these bi-directional contactless interfaces 11-21 can also be employed in unidirectional operation, for example for reasons of compatibility. Such bi-directional contactless device interfaces are, for example, infrared interfaces e.g. High Speed Infrared (HSIR) interfaces or IrDA interfaces (Infrared Data Association), inductive interfaces, for instance Radio Frequency Identification (RFID) interfaces, Home RF (Radio Frequency) interfaces, Digital European Cordless Telecommunications (DECT) interfaces or other Cordless Telecommunications System (CTS) interfaces, or high frequency radio interfaces, in particular so-called Bluetooth interfaces, which work e.g. at 2.4 GHz and were described, for example, on the Internet on the page www.bluetooth.com at the time of filing of the present application.

A payment terminal identification is assigned to each of the payment terminals 2 which makes it possible to identify a respective payment terminal 2 from among a plurality of payment terminals 2 present at the service point 5. The payment terminal identification is, for example, a number, for instance "12", a sequence of letters, for instance "BE" or a mixed sequence of letters and numbers, for instance "K3", which, as a rule, can be limited to two or three digits, or respectively letters to ensure an unambiguous identification of a payment terminal 2 at a service point 5.

The payment terminals 2 each comprise means of informing a customer about the payment terminal identification, for instance a sign or a board on which the payment terminal identification is displayed in a way visible to the customer. In an embodiment variant, which will be gone into more closely later, the payment terminal identification can be transmitted in each case by the payment terminal identification module 22 of the payment terminal 2, for example a software module, via the contactless interface 11-21 to a respective mobile device 1. The payment terminals 2 each comprise means of informing a customer participating in a payment transaction about a total transaction amount to be paid for the payment transaction, for instance a display 29 as well as suitable software modules for controlling this display 29. The payment terminal identification can also be shown on this display 29.

If the customer would like to pay the total amount of the payment transaction by means of his mobile device 1, he switches on his mobile device 1, and, in an embodiment variant, is requested by an authentication module 12 of the mobile device 1, for instance a programmed software module, to authenticate himself for security reasons. The customer is asked to enter a personal identification code (Personal Identification Number, PIN), for example, which is received by the authentication module 12, and is compared with a code stored in a secured way in the mobile device 1, for instance on a SIM card 17 (Subscriber Identification Module) of the mobile device 1. In a variant, the authentication module 12 has available in addition hardware components and further software components to receive a biometric feature of the customer for authentication and to compare it to a biometric feature stored beforehand in a secured way in the mobile device 1, for instance on a SIM card 17 of the mobile device 1. The biometric feature is, for example, a voice pattern, which is recorded by means of a microphone of the mobile device 1, a fingerprint or facial features recorded with a video sensor of the mobile device 1, or an eye pattern, e.g. a pattern of the iris or retina, which has been registered with a suitable scanner.

If applicable, following a successful authentication, the customer selects by means of operating elements 18 on his mobile device 1 the function "payment transaction" from a menu of functions shown on the display 19 of the mobile device 1. The menu and function execution control is implemented, for example, through a programmed software module of the mobile device 1, e.g. through a Java applet, which is stored, for instance, on the SIM card 17 of the mobile device 1. For reasons of security, the software module(s) can be blocked from carrying out the function "payment transaction", for instance by a responsible operator via the mobile radio network 6 or via a contactless device interface 21-11, for example in that a signed or certified command word is transmitted to the mobile device 1 by means of suitable messages, where it is processed by a corresponding software module.

After selection of the function for the payment transaction, the user is requested by the transaction initiation module 13 of the mobile device 1, for example a programmed software module, to enter the payment terminal identification for the respective payment transaction. The customer can type in the payment terminal identification, for example using the operating elements 18 of the mobile device 1. If the mobile device 1 has a suitable speech recognition module, the customer can also indicate the payment terminal identification to the mobile device 1 by means of spoken language In a variant, to prevent entry errors, the mobile device 1 can receive the payment terminal identification of the respective payment terminal 2 via the contactless device interface 11-21, as is indicated by the arrow of broken lines S1 in FIG. 2, for instance by means of the transaction initiation module 13 of the mobile device 1, and show it on the display 19 of the mobile device 1, so that the customer can thereby indicate to the mobile device 1 the payment terminal identification for the respective payment terminal 2 by accepting the displayed payment terminal identification by means of the operating elements 18 of the mobile device 1.

In this latter variant, the payment terminal identification module 22 of the payment terminal 2 can transmit the payment terminal identification repeatedly, for instance periodically, for example during a predefined time interval, or until the payment transaction is initiated via the contactless device interface 11-21 by the mobile device 1 taking part in the respective payment transaction, as will be described in more detail later, whereby the transmitting power of the transmitter 21 is selected in such a way that the payment terminal identification can be received only in the narrower range around the payment terminal 2 and is not received in an unnecessary way by other mobile devices 1 at the service point 5.

The transaction initiation module 13 of the mobile device 1 prepares a transaction initiation record comprising a linking of the indicated payment terminal identification to a customer identification for the customer, and initiates the payment transaction by transmitting this transaction initiation record via the contactless device interface 11-21 to the respective payment terminal 2, as is indicated by the arrow S2 in FIGS. 1 and 2. Received transaction initiation records can be filtered in the payment terminal 2 on the basis of payment terminal identification contained therein. As indicated by the arrow S2' in FIG. 2, the transaction initiation module 13 of the mobile device 1 transmits the transaction initiation record moreover via the mobile radio network 6 to the central transaction unit 4.

The central transaction unit 4 is based, for example, on a conventional communications server, i.e. a computer set up as a server with suitable operations systems and database systems, data stores and a communications module 45. The central transaction unit 4 can also be achieved with a plurality of computers linked to one another The communications module 45 comprises, for example, a software module as well as the necessary hardware components to communicate via the mobile radio network 6 as well as via the communication network 3, i.e. in particular to exchange data with the mobile devices 1 and the payment terminals 2 via these networks. The communication network 3 is, for example, a fixed network, for instance the public switched telephone network, an ISDN network, an Internet network, or a LAN (Local Area Network) or WAN (Wide Area Network), or a mobile radio network, for example a GSM or a UMTS network, or another, e.g. satellite-based, mobile radio network. It should be pointed out here that the connection of the central transaction unit 4 to the mobile radio network 6 has been shown only so schematically in FIG. 1 and that this connection takes place in a known way, for example via a fixed network connection and via an exchange, in particular a Mobile Switching Centre (MSC). The mobile devices 1 can also communicate via the Internet with the central transaction unit 4, for example by means of WAP (Wireless Application Protocol), suitable Java applets (Java is a registered trademark of Sun Microsystems) and/or SIM Toolkit functions.

The customer identification makes it possible for the customer to be identified as a registered participant in the inventive payment transaction method. The customer identification can be structured in such a way, for example, that it comprises an allocating authority identification which identifies the allocating authority that has assigned the customer identification to the respective customer, for example the operator of a chain of service points 5, and comprises an unambiguous customer number for this allocating authority. The customer identification can also be foreseen for international use and comprise, for instance, country identifications and/or other suitable data elements, for instance an expiration date. The customer identification can also be provided with an electronic signature or implemented as a secured certificate.

The payment terminal 2 comprises a transaction placing module 23, for example a programmed software module, which prepares a transaction placing record after receipt of the transaction initiation record, which transaction placing record comprises at least the customer identification, the payment terminal identification and the total transaction amount for the respective payment transaction as well as a service point identification, and transmits this transaction placing record via the communication network 3 to the central transaction unit 4, as is indicated by the arrow S3 in FIG. 2. This transmission takes place, for example, automatically or not until after entry of a corresponding command into the payment terminal 2 by employees of the service point 5.

In the central transaction unit 4, the transaction initiation record transmitted from the mobile device 1 is received by mean of the communications module 45 and is temporarily stored, as indicated by the arrow S2' in FIG. 2. In the central transaction unit 4, the transaction placing record transmitted from the payment terminal 2 is also received by means of the communications module 45 and is temporarily stored, as indicated by the arrow S3 in FIG. 2. The communications module 45 thereby additionally determines in a known way the call number, for instance the MSISDN number (Mobile Subscriber ISDN), of the mobile device 1 which has transmitted the transaction initiation record, and stores this call number, assigned to the transaction initiation record received from the mobile device 1, in the central transaction unit 4.

As illustrated in FIG. 2, the central transaction unit 4 expects for a respective payment transaction the transmission of the transaction placing record from the payment terminal 2, as indicated by the arrow S3, within a predefined time interval $\Delta t_1$ after the central transaction unit 4 has received the transmission of the transaction initiation record from the mobile device 1, as indicated by the arrow S2'. Otherwise a time error will be registered in the central transaction unit 4 and the further processing of the payment transaction discontinued, for example after corresponding notification of the mobile device 1. One skilled in the art will understand that, for instance owing to differing transmission times, the receipt and correspondingly the storing of the transaction initiation record and of the transaction placing record can take place in reverse sequence, so that the time interval $\Delta t_1$ is started by receipt of the transaction placing record.

The central transaction unit 4 comprises a payment request module 42, for example a programmed software module, which compares transaction placing records received from payment terminals 2, on the basis of the payment terminal identification and customer identification contained therein, with transaction initiation records which were received from the mobile devices 1. In the case of a match, the payment request module 42 prepares a payment request comprising, for example, at least the matching payment terminal identification as well as the total transaction amount contained in the respective transaction placing record. As indicated by the arrow S4 in FIG. 2, the prepared payment request is transmitted by the payment request module 42 of the central transaction unit 4, with the aid of the communication module 45, via the mobile radio network 6 to the mobile device 1 with the determined call number. Otherwise, if the payment request module 42 cannot identify any matching payment terminal identifications and customer identifications, a corresponding error message is transmitted by the central transaction unit 4 to the mobile device 1, for instance with the request to enter the payment terminal identification again. It should be mentioned here that, to increase security, in particular to determine the authenticity of the central transaction unit 4, the payment request is executed by the payment request module 42 in a way provided with an electronic signature of the central transaction unit 4 or as a secured certificate.

In the respective mobile device 1, the payment request transmitted by the central transaction unit 4 is received via the mobile radio network 6, and, in a variant, is filtered on the basis of the payment terminal identification contained therein, in that the payment terminal identification contained in the payment request is compared by the mobile device 1 with the payment terminal identification transmitted beforehand to the central transaction unit 4. In a payment record module 14 of the mobile device 1, for example a programmed software module, a payment record is prepared on the basis of the received payment request, for example after the authenticity of the payment request, or respectively the authenticity of the central transaction unit 4, has been checked and the payment request has been shown to the customer on the display 19 of the mobile device 1 and the customer has accepted, and thus enabled, the payment by means of the operating elements 18 of the mobile device 1. The prepared payment record comprises the received payment request and an identification of the customer, for instance the above-mentioned customer identification or an IMSI (International Mobile Subscriber Identity), which are each stored on the SIM card 17 of the mobile device 1. For improvement of security, the payment record can be provided with an electronic signature of the respective customer by the payment record module 14 or can be implemented as secured certificate. The payment record can also be provided with a time/date indication.

Preferably, the payment record module 14 additionally inserts into the payment record indications about the desired mode of payment, which indications are stored, for example, as a default value on the SIM card 17 of the mobile device 1 or are requested by the respective customer via the display 19 of the mobile device 1 and are accepted via the operating elements 18. The indications about the desired mode of payment specify, for instance, a desired debiting of the total transaction amount to be paid to a particular credit card number, a debiting to a particular customer account, a debiting to a particular bank account or a debiting against a prepaid monetary sum stored in the mobile device, for example on the SIM card 17 of the mobile device 1. The payment record module 14 of the mobile device 1 transmits the prepared payment record via the mobile radio network 6 to the central transaction unit 4, as indicated by the arrow S5 in FIG. 2.

For a respective payment transaction, as illustrated in FIG. 2, the central transaction unit 4 expects the transmission of the payment records from the mobile device 1, indicated by the arrow S5, within a predefined time interval $\Delta t_2$ after the central transaction unit 4 has carried out the transmission of the payment request to the mobile device 1, indicated by the arrow S4. Otherwise a time error will be registered in the central transaction unit 4, and, for instance, the transmission indicated by the arrow S4 carried out again, and the further processing of the payment transaction possibly discontinued, e.g. after corresponding notification of the payment terminal 2, for example in the case of repeated failure.

In the central transaction unit 4, the payment record is received, for example by the payment request module 42, and, if applicable, the authenticity of the customer is checked on the basis of the electronic signature, or respectively the certificate. In an embodiment variant, the central transaction unit 4 checks the solvency of the respective customer on the basis of the identification of the customer transmitted in the payment record, for instance by means of the solvency checking module 43, which is implemented e.g. as a programmed software module. In so doing, the solvency checking module accesses e.g. directly, or via suitable services, a corresponding database, the content of which is administered by a communication network operator, for instance the operator of the mobile radio network 6 or by a financial institution. In the case of a negative result of the solvency check, or respectively of the authenticity check, the central transaction unit 4 can transmit, if applicable, a negative transaction confirmation to the respective mobile device 1 as well as to the payment terminal 2 participating in the respective payment transaction, for instance through the transaction confirmation module 44, which is implemented e.g. as a programmed software module, by means of which negative transaction confirmation the respective customer is refused payment of the payment transaction via the method according to the invention, owing to lack of solvency. In the case of a positive result of the solvency check and/or of the authenticity check, the transaction confirmation module 44 of the central transaction unit 4 transmits a positive transaction confirmation to the payment terminal 2 taking part in the respective payment transaction and to the respective mobile device 1. The transaction confirmations contain at least indications for identification of the respective payment transaction as well as an indication as to whether involved is a positive or a negative transaction confirmation, the respective reasons being given in the latter case, for example an above-mentioned time error, lack of solvency or non-confirmed authenticity of the respective customer. In the case of a positive transaction confirmation, the payment transaction is considered effected for the payment terminal 2 and for the mobile device 1, or respectively for the particular customer, and the purchased products and/or services can be released to the customer at the service point 5. One skilled in the art will understand that, for example, the positive transaction confirmation is not transmitted by the central transaction unit 4 to the transaction partners taking part in the respective payment transaction until the further processing, described below, of the payment record has been completed by the central transaction unit 4. The transmission of the transaction confirmation by the central transaction unit 4 to the payment terminal 2 is indicated by the arrow S6 in FIG. 2, and the transmission of the transaction confirmation by the central transaction unit 4 to the mobile device 1 is indicated by the arrow S7 in FIG. 2. In particular, positive transaction confirmations can be also be transmitted by the central transaction unit 4 by means of email, fax or letter mail to a predefined email address, fax number or respectively postal address of the respective customer and/or (of the operator) of the service point 5.

Preferably, the payment records and/or the positive transaction confirmations are stored in a memory 15 of the mobile device 1, for example by the payment record module 14, e.g. on a SIM card 17 of the mobile device 1, so that they can be used later as a receipt and/or are available to the respective customer for administration of the payment transactions made by him. If transaction confirmations are used for bookkeeping purposes or as receipts by the service point 5, or respectively its operator, and the customer, for instance in the mobile device 1, they additionally contain at least the total transaction amount for the respective payment transaction, preferably however also further indications mentioned above which are contained in the payment record for the respective payment transaction, in particular signatures, or respectively certificates of the participating transaction partners.

The transaction placing module 23 of the payment terminal 2 comprises, for example, programmed means which determine a transaction identification for a payment transaction and insert this transaction identification into the transaction placing record. This transaction identification contains, for example, the payment terminal identification, the service point identification as well as a transaction number, which is increased by increments for each new transaction, for example, and/or comprises a time/date indication. One skilled in the art will understand that the transaction identification can also be replaced with an unstructured, unambiguous transaction number; a centralized administration of the transaction identifications would thereby be necessary, however. The number of numerical digits and/or letters of the service point identification depends upon how many service points 5 carry out their payment transactions via the central transaction unit 4. The service point identification can be structured in such a way, for example, that it comprises an allocating authority identification which identifies the allocating authority that has assigned the service point identification to the respective service point 5, for example the operator of a chain of service points 5, and comprises an unambiguous service point number for this allocating authority. The service point identification can also be foreseen for international use and comprise, for instance, country identifications and/or other suitable data elements. The number of numerical digits and/or letters of the transaction number depends upon how many payment transactions are carried out in a predefined time interval, for instance a day or half a day, via a payment terminal 2.

In the case of a positive result of the solvency check and/or of the authenticity check, if applicable, the payment record is further processed in the central transaction unit 4, if applicable under consideration of the indications contained therein about the customer's desired mode of payment. By means of the communications module 45, the payment records can be forwarded, for example via the communication network 3, to a financial institution or a clearing point, or the total transaction amount can be directly deducted by the central transaction unit 4, via the mobile network 6, from a prepaid monetary amount stored in the mobile device 1, for example stored in the SIM card 17 of the mobile device 1. On the basis of the service point identification contained in the transaction placing record, the total transaction amount can be credited to the service point 5 by the central transaction unit 4, for instance through the crediting module 41 of the central transaction unit 4, implemented e.g. as a software module, this credit being credited, for instance, to a corresponding account in the central transaction unit 4 or accessible via the communication network 3 in a database of a financial institution. The crediting can also be accomplished, however, in the way described above via the financial institution or the clearing point.

As already mentioned in connection with the menu and function execution control for selection of the function "payment transaction," the software modules, in particular the transaction initiation module 13 and the payment record module 14 as well as software components of the authentication module 12 can be stored, for instance, on the SIM card 17 of the mobile device, e.g. as Java applet or as SIM Toolkit functions, and can also be executed on a processor of the SIM card 17, for instance. The software modules can moreover be achieved in such a way that they can be blocked by an authorized operator via the contactless device interface 11 or via the mobile radio network 6, for instance if the owner of the mobile device 1 has reported the loss of the respective mobile device 1 to a responsible operator.

As a final point, it should be added that the data transmissions via the contactless interface 21-11 can be encrypted, to increase security, according to a method known to one skilled in the art.

The payment transaction method according to the invention and the payment transaction system according to the invention make it possible for customers equipped with a mobile device 1 to carry out payment transactions without cash with their mobile devices 1 at a service point 5 equipped with one or more payment terminals 2. In so doing, a customer, after having authenticated himself at his mobile device 1, for example, depending upon the embodiment variant, needs only to type in the payment terminal identification for the respective payment terminal, or does not need to type any further data at all into the mobile device 1. Such payment transactions from one or more service points 5 can be completed in a central transaction unit 4, the central transaction unit 4 being able to check the authenticity of participating payment transaction partners and the solvency of customers as well as carry out debits according to indications of the customers and credits for payment transactions.

| List of Reference Numerals | |
|---|---|
| 1 | mobile device |
| 2 | payment terminal |
| 3 | communication network |
| 4 | central transaction unit |
| 5 | service point (POS) |
| 6 | mobile radio network |
| 11 | contactless device interface |
| 12 | authentication module |
| 13 | transaction initiation module |
| 14 | payment record module |
| 15 | memory means |
| 16, 26 | processor |
| 17 | SIM card |
| 18 | operating elements |
| 19 | display |
| 21 | contactless device interface |
| 22 | payment terminal identification module |
| 23 | transaction placing module |
| 24 | communications module |
| 29 | display |
| 41 | crediting module |
| 42 | payment request module |
| 43 | solvency checking module |
| 44 | transaction confirmation module |
| 45 | communications module |
| S1 | transmission of the payment terminal identification |
| S2, S2' | transmission of the transaction initiation record |
| S3 | transmission of the transaction placing record |
| S4 | transmission of the payment request |
| S5 | transmission of the payment record |
| S6, S7 | transmission of the transaction confirmation |

The invention claimed is:

1. A payment transaction method between a user having a portable mobile device and a service point that includes a plurality of payment terminals, each of the plurality of terminals including a payment terminal identification that distinguishes each of the plurality of payment terminals of the service point from each other, the method comprising:

determining a total amount of a transaction by a payment terminal of the service point and informing a user about the total amount of the transaction and about a payment terminal identification identifying the payment terminal;

indicating the payment terminal identification to the mobile device;

first preparing a transaction initiation record in the mobile device by linking the payment terminal identification of said indicating to a user identification identifying the user the transaction initiation record including the payment terminal identification and the user identification;

first transmitting the transaction initiation record from the mobile device via a contact-less interface to the payment terminal of said indicating;

second transmitting the transaction initiation record from the mobile device via a mobile radio network to a central transaction unit;

second preparing a transaction placing record by the payment terminal after receiving the transaction initiation record from said second transmitting, the transaction placing record including the user identification, the payment terminal identification, and a total amount of the transaction;

third transmitting said transaction placing record by the payment terminal via a communication network to the central transaction unit; and fourth transmitting a payment request by the central transaction unit via the mobile radio network to the mobile device that performed said first and second transmitting.

2. The payment transaction method according to claim 1, further comprising:
third preparing a payment record with the mobile device by linking the payment request to the user identification; and
fifth transmitting the payment record from the mobile device via the mobile radio network to the central transaction unit.

3. The payment transaction method according to claim 2, wherein said third preparing further includes: inserting indications about a mode of payment in the payment record.

4. The payment transaction method according to claim 1, wherein said second preparing further includes:
inserting a service point identification by the payment terminal into the transaction placing record; and
crediting the total amount of the transaction to the service point of the payment terminal.

5. The payment transaction method according the claim 1, further comprising:
authenticating a user at the mobile device with a biometric feature before said indicating the payment terminal identification.

6. The payment transaction method according to claim 1, further comprising:
initial transmitting of the payment terminal identification of the payment terminal to the mobile device via the contact-less interface, and
said indicating the payment terminal identification further includes,
operating input elements of the mobile device to accept the payment terminal that was identified by said initial transmitting.

7. The payment transaction method according to claim 1, further comprising:
verifying a solvency of the user in the central transaction unit.

8. A payment transaction system comprising:
a central transaction unit;
a portable mobile device having a first contact-less interface and configured to communicate with the central transaction unit via a mobile radio network;
a service point including a plurality of payment terminals having second contact-less interfaces, the first contact-less interfaces configured to send data to the second contact-less interface, the plurality of payment terminals each having a payment terminal identification that distinguishes each of the plurality of payment terminals from each other, the plurality of payment terminals include an information device configured to inform a user about the payment terminal identification, and configured to inform the user about the total amount of a transaction for a payment transaction,
wherein the mobile device further includes,
a transaction initiation module configured to receive a payment terminal identification indicated by the user, to prepare a transaction initiation record including a linkage of the indicated payment terminal identification to a user identification, the transaction initiation record including the payment terminal identification and the user identification, and to transmit the transaction initiation record by the first contact-less interface to the respective payment terminal, and to transmit the transaction initiation record via a mobile radio network to a central transaction unit,
wherein the plurality of payment terminals further include,
a transaction placing module configured to prepare a transaction placing record after receipt of the transaction initiation record from the mobile device, the transaction placing record including the user identification, the payment terminal identification, and the total amount of the transaction for the respective payment transaction, and to transmit the transaction placing record via a communication network to the central transaction unit, and
wherein the central transaction unit further includes,
a payment request module configured to transmit a payment request including the total amount of the transaction for the respective payment transaction via the mobile radio network to the mobile device that sent the transaction initiation record.

9. The system according to claim 8, wherein the mobile device further comprises:
a payment record module configured to prepare a payment record including a payment request received by the mobile device from the central transaction unit, and a user identification for the respective user, and configured to transmit the payment record via the mobile radio network to the central transaction unit.

10. The system according to claim 9, wherein the payment record module further comprises an input device configured to insert indications about the mode of payment into the payment record.

11. The system according to claim 8, wherein the transaction placing module further comprises:
an input device configured to insert a service point identification into the transaction placing record before sending the transaction placing record, and
the central transaction unit further comprises,
a crediting module configured to credit the total amount of the transaction for the respective payment transaction to the service point identified through the service point identification.

12. The system according to claim 8, wherein the mobile device further includes:
an authentication module configured to receive a biometric feature from the user and to authenticate the user on a basis of the received biometric feature.

13. The system according to claim 8, wherein the plurality of payment terminals each further comprise:
a payment terminal identification module configured to transmit the payment terminal identification via the second contact-less device interface directly to the first contact-less interface of the mobile device, and
the transaction initiation module further comprises a receiver configured to accept a command entered by the user by operating elements of the mobile device and configured to receive the payment terminal identification for the respective payment terminal corresponding to the acceptance command.

14. The system according to claim 8, wherein the central transaction unit further comprises:
a solvency checking module configured to check a solvency of the user.

15. The payment transaction method according to claim 1, wherein said first transmitting further comprises:
transmitting the transaction initiation record from the mobile device by a first contact-less port of the mobile device to a second contact-less port of the payment terminal.

* * * * *

UNITED STATES PATENT AND TRADEMARK OFFICE
CERTIFICATE OF CORRECTION

| | | |
|---|---|---|
| PATENT NO. | : 7,478,065 B1 | Page 1 of 1 |
| APPLICATION NO. | : 10/168387 | |
| DATED | : January 13, 2009 | |
| INVENTOR(S) | : Ritter et al. | |

It is certified that error appears in the above-identified patent and that said Letters Patent is hereby corrected as shown below:

On the title page, Item (86), the PCT number is incorrect. Item (86) should read:

-- (86) PCT No.: PCT/CH99/00623 --

Signed and Sealed this

Seventeenth Day of March, 2009

JOHN DOLL
*Acting Director of the United States Patent and Trademark Office*